United States Patent [19]

Kato et al.

[11] 4,205,147

[45] May 27, 1980

[54] PROCESS FOR RECOVERING MODIFIED POLYVINYL ALCOHOLS FROM AQUEOUS SOLUTION CONTAINING THEM

[75] Inventor: Hiroshi Kato, Nishinomiya, Japan Nippon Gohsei Kagaku Kogyo Kabushiki Kaisha, Osaka, Japan

[73] Assignee: Nipon Gohsei Kagaku Kogyo

[21] Appl. No.: 873,064

[22] Filed: Jan. 27, 1978

[30] Foreign Application Priority Data

Jan. 31, 1977 [JP] Japan .................................. 52-10072

[51] Int. Cl.² .............................................. C08F 6/12
[52] U.S. Cl. ......................................... 525/62; 8/138; 210/44; 210/45; 210/51; 210/56; 526/287; 526/317
[58] Field of Search ..................... 8/115.6, 115.7, 138; 210/51-53, 56, 42 R, 44, 45, 49; 260/29.6 SQ; 526/10, 11, 287, 317

[56] References Cited

U.S. PATENT DOCUMENTS

| | | | |
|---|---|---|---|
| 2,834,759 | 5/1958 | Austin | 260/29.6 SQ |
| 3,960,485 | 6/1976 | Fantl et al. | 210/51 |
| 4,066,541 | 1/1978 | Sando et al. | 210/51 |
| 4,078,129 | 3/1978 | Yamagata | 526/11 |

FOREIGN PATENT DOCUMENTS

| | | | |
|---|---|---|---|
| 5128355 | 3/1976 | Japan | 210/51 |
| 5198155 | 8/1976 | Japan | 210/52 |
| 5198156 | 8/1976 | Japan | 210/52 |

*Primary Examiner*—Charles N. Hart
*Assistant Examiner*—Peter A. Hruskoci
*Attorney, Agent, or Firm*—Armstrong, Nikaido, Marmelstein & Kubovcik

[57] ABSTRACT

Recovery of partially hydrolyzed copolymers of vinyl acetate and unsaturated carboxylic or sulfonic acid from aqueous solution dissolving them by adding an acid to the solution at a temperature of at least 40° C. and then separating the deposited copolymers. This process can be advantageously applied to waste water dissolving the above hydrolyzed copolymers from desizing and washing of textile. About 70 to about 90% of the hydrolyzed copolymers dissolved in the solution can be recovered, and the recovered copolymers can be reused as a sizing agent for fibers.

7 Claims, No Drawings

PROCESS FOR RECOVERING MODIFIED POLYVINYL ALCOHOLS FROM AQUEOUS SOLUTION CONTAINING THEM

BACKGROUND OF THE INVENTION

The present invention relates to a process for recovering hydrolyzed copolymers of vinyl acetate and unsaturated carboxylic or sulfonic acid from an aqueous solution dissolving them.

Various polyvinyl alcohols are widely employed as sizing agents for fibers, and the waste water from scouring inevitably dissolves these polyvinyl alcohol sizing agents. The recovery of polyvinyl alcohol sizing agents from such a waste water is of advantage to the reduction of cost for sizing agent and the cleaning of waste water. As a conventional process for removing polyvinyl alcohols from the waste water of desizing, there are known a salting out method, a flocculent sedimentation method using polyvalent metal salts, a bubble separation method, an oxidation method, an absorption method, an insolubilization method by formalization and a biochemical treatment method. However, these known methods have the disadvantages that the degree of removal is generally low and moreover polyvinyl alcohols are decomposed or, even if recovered, the recovered polyvinyl alcohols contain other additives and cannot be reused as sizing agents.

As a result of investigation to use polyvinyl alcohols, the present inventor already found that modified polyvinyl alcohols having a degree of hydrolysis in the vinyl acetate units of 50 to 80% by mole which are obtained by alkali-hydrolyzing copolymers of vinyl acetate and unsaturated carboxylic or sulfonic acid, particularly those containing the unsaturated carboxylic or sulfonic acid units of 0.05 to 10% by mole, exhibit the excellent sizing effect on a hydrophobic fiber such as polyester filament yarn and a blended yarn of a polyester with a hydrophilic fiber such as cotton, viscose rayon or linen. However, there has never been yet proposed an effective process for recovering such particular modified polyvinyl alcohols from the desizing waste water.

OBJECTS OF THE INVENTION

It is an object of the present invention to provide a process for recovering partially hydrolyzed copolymers of vinyl acetate and an unsaturated carboxylic or sulfonic acid from an aqueous solution dissolving them.

Another object of the invention is to provide a process for recovering the partially hydrolyzed copolymers which can be reused as a sizing agent.

These and other objects of the invention will become apparent from the description hereinafter.

DETAILED DESCRIPTION

It has now been found that the above-mentioned objects can be attained by adding an acid to an aqueous solution dissolving hydrolyzed copolymers of vinyl acetate and an unsaturated carboxylic or sulfonic acid (these hydrolyzed copolymers being hereinafter referred to as "modified polyvinyl alcohols"), while maintaining the aqueous solution at a temperature of not less than 40° C., and then recovering the deposited copolymers.

This process can be effectively applied to a waste water from a scouring process, dissolving the modified polyvinyl alcohols. The modified polyvinyl alcohols dissolved in the waste water can be readily deposited by adding an acid and separated in high yields. The separated deposit can be redissolved by converting the recovered modified polyvinyl alcohols into the salt type with an alkali, and can be used repeatedly as a sizing agent.

The carboxyl group and sulfonic acid group in the modified polyvinyl alcohols obtained by hydrolyzing copolymers of vinyl acetate and an unsaturated carboxylic or sulfonic acid in the presence of an alkali catalyst are present necessarily in the form of salt, and contribute to solubilization in water of the modified polyvinyl alcohols. The solubility in water of the modified polyvinyl alcohols is remarkably decreased by the addition of an acid to convert into carboxylic or sulfonic acid. Also, the modified polyvinyl alcohols having a degree of hydrolysis in the vinyl acetate units of 50 to 80% by mole show the cloud point at a temperature of not less than 40° C., and tend to insolubilize in water at this temperature range. The present invention has been accomplished by skillfully utilizing such properties of the particular modified polyvinyl alcohols.

The modified polyvinyl alcohols in the present invention are alkali-hydrolyzed copolymers of vinyl acetate and an unsaturated carboxylic or sulfonic acid, particularly those having a degree of hydrolysis in the vinyl acetate units of 50 to 80% by mole. Examples of the unsaturated carboxylic acid are acrylic acid, methacrylic acid, crotonic acid, maleic acid monoalkyl esters, fumaric acid monoalkyl esters, and their salts. The amides of the above carboxylic acids, maleic acid anhydride and maleic acid dialkyl esters may also be used, since they are converted into the salts of the carboxylic acids as a result of the alkali-hydrolysis. When maleic acid monoalkyl esters having an alkyl group of 1 to 4 carbon atoms are employed, the obtained modified polyvinyl alcohols show particularly good sizing property. Also, examples of the unsaturated sulfonic acid are ethylenesulfonic acid, allylsulfonic acid, 2-methylallylsulfonic acid, and their salts.

Although the content of the unsaturated carboxylic or sulfonic acid in the modified polyvinyl alcohols is not particularly limited, the modified polyvinyl alcohols containing 0.05 to 10% by mole, particularly 0.1 to 2% by mole, of the unsaturated acid units are suitably employed as a sizing agent for fibers. When the content is less than 0.05% by mole, the polymers are deposited under the temperature condition for sizing, and when the content is more than 10% by mole, the polymers have excess hygroscopicity and tackiness and are inferior in sizing property.

The modified polyvinyl alcohols are prepared by hydrolyzing the copolymers of vinyl acetate and an unsaturated carboxylic or sulfonic acid in the presence of an alkali catalyst such as sodium hydroxide, potassium hydroxide or alkali metal alkoxides, and preferably in an alcoholic medium such as methanol or ethanol. The hydrolysis is carried out in any conventional manner, for instance, by a continuous or batchwise operation with or without kneading, or by dispersing an alcoholic solution of the copolymer into a non-solvent such as liquid paraffin in the form of fine droplets. The hydrolysis is carried out until the degree of hydrolysis in the vinyl acetate units reaches 50 to 80% by mole. The thus hydrolyzed copolymers are suitably employed as a sizing agent for fibers. When the degree of hydrolysis is less than 50% by mole, the desizing property is not good, and when the degree of hydrolysis is more than 80% by mole, the adhesiveness to a hydrophobic fiber is poor. Also, the modified polyvinyl alcohols having the degree of hydrolysis of more than 80% by mole is almost impossible to recover from waste water of desizing and washing.

In the present invention, in order to separate the above-mentioned particular modified polyvinyl alcohols from waste water dissolving them, it is necessary to conduct both procedures of (1) adding an acid to the waste water and (2) maintaining the waste water at a temperature of not less than 40° C., preferably not less than 50° C. These procedures can be conducted in arbitrary order. Usually after heating the waste water to over 40° C., an acid is added to the waste water with agitation. The modified polyvinyl alcohols can not be deposited by only one procedure of (1) or (2), and even if deposited, the deposition is extremely insufficient.

Various inorganic and organic acids are employed in the above procedure (1). Typical examples of the acid employed in the present invention are hydrochloric acid, sulfuric acid, nitric acid, phosphoric acid, pyrophosphoric acid, phosphorous acid, acetic acid, oxalic acid, and citric acid. Hydrochloric acid, sulfuric acid and acetic acid are preferred. It is desirable to employ an approximately equivalent or more of the acid to the unsaturated carboxylic or sulfonic acid salt component of the modified polyvinyl alcohols present in waste water. The acid is usually employed in excess in an amount of 5 to 20 times the equivalent or more than 20 times the equivalent. In many cases, the waste water is below about pH 7, usually pH 6 to 2, when the acid is added thereto.

The waste water is maintained at a temperature of not less than 40° C., preferably not less than 50° C. in a suitable manner, for instance, by externally heating the waste water placed in a vessel, or by blowing steam into the waste water, or by pouring a hot water or throwing a hot body into the waste water, or by utilizing solar heat.

The modified polyvinyl alcohols are deposited immediately in the form of flock or cream by the above-mentioned procedures (1) and (2). The deposited polymer can be readily separated in a known manner such as filtration, centrifugation, decantation or dipping up by a net. In particular, when the waste water is agitated under an appropriate condition, the deposited polymer is readily separated and recovered by a scraper, since the deposited polymer flocks are coagulated and rise to the surface of the waste water. The separation efficiency is generally favorable, and usually about 70 to 90% by weight of the modified polyvinyl alcohols dissolved in the waste water is recovered with ease.

The separated deposit contains water, but in many cases it is not necessary to dry it, since an aqueous solution of the original salt type modified polyvinyl alcohols can be directly reproduced by adding an alkaline substance such as sodium hydroxide, potassium hydroxide, sodium carbonate or aqueous ammonia to the water-containing deposit. The thus obtained aqueous solution can be reused for the sizing by adjusting the concentration. Such a reuse is industrially very advantageous, and the process of the present invention has the advantages that not only waste water from scouring can be efficiently treated, but also the cost for sizing can be reduced by utilization of the recovered polymer. Such a merit could not possibly obtained from a conventional technique of treating waste water containing polyvinyl alcohols.

Waste water from a scouring process of textile generally contains various additives, for instance, sizing agents other than the modified polyvinyl alcohols such as starch, oiling agents, assistants and anti-foaming agents, and even if they are included in waste water, only modified polyvinyl alcohols can be efficiently recovered according to the process of the present invention.

Although the invention has been described with reference to the recovery of the modified polyvinyl alcohols used as a sizing agent for fiber, it is to be understood that the invention is not limited to such a specific embodiment. The modified polyvinyl alcohols are also applied to film, fiber, adhesive, coating, binder, laundry paste, cosmetics and temporary protective coating, as well as a sizing agent. Irrespective of uses of the modified polyvinyl alcohols, the process of the present invention can be applied to separate and recover the modified polyvinyl alcohols from an aqueous solution containing the modified polyvinyl alcohols.

The present invention is more specifically described and explained by means of the following Examples, in which all % are % by weight unless otherwise stated.

EXAMPLE 1

By employing, as a modified polyvinyl alcohol, hydrolyzed vinyl acetate-sodium monomethyl maleate copolymer having a degree of hydrolysis of 70.0% by mole which was obtained by hydrolyzing copolymer of vinyl acetate and 0.5% by mole of monomethyl maleate in methanol in the presence of sodium hydroxide, procedures of deposition-recovery-redissolution were repeated on a laboratory scale.

The deposition was carried out by adding five equivalents of hydrochloric acid to monomethyl maleate to an aqueous solution of the modified polyvinyl alcohol at a temperature of 60° C. After heating to 60° C., the acid was added. The solution was agitated at 600 r.p.m. by an agitator of propeller type, by which the deposited polymer rose to the surface in the form of cream. The deposited polymer could be readily recovered by merely dipping up.

When either of the acid addition or the heating to more than 40° C. was omitted, no polymer was deposited.

The polymer content of the recovered creamy matter fell within the range of 12 to 16%. The creamy matter was neutralized with sodium hydroxide by employing BTB indicator to redissolve the polymer. About 1.7 to about 2.1 equivalents of sodium hydroxide to monomethyl maleate was required in the neutralization, depending on the amount of hydrochloric acid present in the creamy matter.

Polymer concentration of the aqueous solution to be treated, recovery, and viscosity and degree of hydrolysis of the recovered polymer are shown in Table 1. The viscosity of the recovered polymer was measured at a temperature of 20° C. with respect to the aqueous solution thereof having a concentration of 4%.

Table 1

| Number of repetitions | 0 | 1 | 2 | 3 | 4 | 5 | 6 |
|---|---|---|---|---|---|---|---|
| Polymer conc. (%) | — | 0.87 | 0.62 | 0.54 | 0.48 | 0.43 | 0.40 |
| Recovery (%) | — | 72 | 84 | 87 | 89 | 87 | 88 |
| Viscosity | 9.5 | 11.0 | 12.0 | 12.2 | 12.6 | 12.9 | 13.0 |
| Degree of hydrolysis | 70.0 | 70.0 | 69.6 | 69.7 | 69.6 | 69.4 | 69.3 |

Table 1-continued

| Number of repetitions (% by mole) | 0 | 1 | 2 | 3 | 4 | 5 | 6 |
|---|---|---|---|---|---|---|---|

As seen in Table 1, the recovery and the viscosity of the recovered modified polyvinyl alcohol were stable after the third repetition, though they varied to some extent before the second repetition.

EXAMPLE 2

By employing the same modified polyvinyl alcohol as in Example 1, 3,000 liters of a liquid having the following composition was prepared.

| Composition | |
|---|---|
| Hydrolyzed vinyl acetate-sodium monomethyl maleate copolymer | 0.50% |
| Non-ionic oiling agent | 0.03% |
| Water | residue |

After heating to 60° C., 4.8 kg. of 5% hydrochloric acid was added to the liquid, while agitating at 450 r.p.m. by an agitator of propeller type and aerating from the bottom of a vessel to coagulate the deposited polymer. After stopping the agitation and aeration, the deposited polymer rose to the surface in the form of white cream. By dipping up the creamy matter, 78.3 kg. of a paste having a solid content of 13.8%, which represented the recovery of 72%, was obtained.

The modified polyvinyl alcohol of sodium salt type was reproduced by adding 1 kg. of 5% sodium hydroxide to adjust pH 7.0.

By employing, as a sizing agent, the original modified polyvinyl alcohol, the reproduced modified polyvinyl alcohol and commonly used sizing agent of partially hydrolyzed polyvinyl acetate and starch, the following three sizing compositions were prepared, and the sizing and weaving tests were then conducted.

| Sizing Compositions | | |
|---|---|---|
| (1) | Original modified polyvinyl alcohol | 8.0% |
| | Non-ionic oiling agent | 0.32% |
| | Water | residue |
| (2) | Reproduced modified polyvinyl alcohol | 8.0% |
| | Non-ionic oiling agent | 0.32% |
| | Water | residue |
| (3) | Polyvinyl alcohol (degree of hydrolysis: 88% by mole, degree of polymerization: 1,700) | 6.5% |
| | Corn starch | 2.5% |
| | Non-ionic oiling agent | 0.45% |
| | Water | residue |

The sizing of a blended yarn, 45/1 of polyester/cotton=65/35 was conducted by employing a sizing machine. In case of the compositions (1) and (2), the sizing temperature and the size pick-up percent were 70° C. and 10.0 to 10.5%, respectively. Also, in case of the composition (3), they were 90° C. and 11 to 12%, respectively.

The weaving was then conducted by employing the thus sized yarns under the following conditions.
Textile to be woven: Poplin
Warp: total ends 4838, density 115 ends/inch
Weft: same yarn as warp, density 65 picks/inch
Loom: Automatic loom; 155-160 r.p.m.
Circumstance: 25°-30° C.; 70-80% RH
Testing amount: 60 yds.×25 pieces×2 looms=3,000 yds.
The results of weaving test are shown in Table 2.

Table 2

| | Warp stops (per hour) | Weaving efficiency (%) | Size shedding |
|---|---|---|---|
| Composition (1) | 0.20 | 92 | A little |
| Composition (2) | 0.20 | 93 | A little |
| Composition (3) | 0.30 | 90 | Ordinary |

EXAMPLE 3

After heating to 60° C. 3,000 liters of a desizing waste water containing 0.40% of hydrolyzed copolymer of vinyl acetate and 0.6% by mole of sodium monomethyl maleate having a degree of hydrolysis in the vinyl acetate units of 70.5% by mole, 2.8 kg. of a 10% hydrochloric acid was added to the waste water with agitation. The waste water immediately became cloudy, and the deposited polymer coagulated. A white paste having a solid content of 30% was separated by filtration and washed with a hot water. A part of the white paste was taken out, dried and weighed to determine the recovery percent. There was recovered 83% of the hydrolyzed copolymer.

To 9.0 kg. of the above white paste, calculated as sodium matter, 800 g. of a 5% aqueous solution of sodium hydroxide was then added, and the mixture was agitated to reproduce an aqueous solution of the original hydrolyzed vinyl acetate-sodium monomethyl maleate copolymer. The thus obtained aqueous solution indicated approximately the same properties as those of the sizing liquid prepared at first. This means that the recovered polymer can be reused as a sizing agent.

By employing the recovered polymer again as a sizing agent, a sizing liquid was prepared, and the sizing property thereof was compared with the original sizing liquid prepared at first.

| Composition of Sizing Liquid | | |
|---|---|---|
| (1) | Fresh sizing liquid | |
| | Hydrolyzed copolymer | 7.5% |
| | Non-ionic oiling agent | 0.3% |
| | Water | residue |
| (2) | Reproduced sizing liquid | |
| | Recovered hydrolyzed copolymer | 7.5% |
| | Non-ionic oiling agent | 0.3% |
| | Water | residue |

Sizing and Weaving

By employing the above sizing liquids, a polyester textured yarn of 75 deniers/36 filaments was sized by a warping sizing machine. The sizing temperature and the size pick-up percent were 50° C. and 9.5 to 10.0%, respectively.

The weaving was then conducted under the following conditions by employing the thus sized yarns.
Textile to be woven: Satin
Warp: total ends 7160, density 147 ends/inch
Weft: same yarn as warp, density 82 picks/inch
Loom: Automatic loom; 155-160 r.p.m.
Circumstance: 25° C.; 75% RH
Testing amount: 56 m.×40 pieces×2 looms=4,480 m.
The results are shown in Table 3.

The results of the sizing and weaving tests using a typical polyvinyl alcohol-acrylic polymer sizing liquid for polyester textured yarn having the following composition are also shown in Table 3 as a Control.

| Composition of Polyvinyl Alcohol-Acrylic Polymer Sizing Liquid | |
|---|---|
| Polyvinyl alcohol (degree of hydrolysis: 88% by mole, degree of polymerization: 500) | 3.8% |
| Sodium salt of copolymer of 50% ethyl acrylate, 35% methyl methacrylate, 10% methacrylic acid and 5% acrylic acid | 3.8% |
| Non-ionic oiling agent | 0.4% |
| Siliconic lubricant | 0.1% |
| Water | residue |

Table 3

| | Adhesion strength g./cm. | Tackiness g./cm. | Size shedding on loom | Gum up tendency on loom | Weaving efficiency % |
|---|---|---|---|---|---|
| Fresh | 51 | 34 | None | None | 92 |
| Reproduced | 49 | 41 | None | None | 90 |
| Control | 46 | 76 | A little | Size gumming was found on reed dents. | 89 |

(Note)

(1) Adhesion strength was measured as follows: A sizing liquid was coated on a polyester film to form a film having a thickness of 100μ, and after conditioning at 20° C., 75% RH, the peeling strength was measured by a tensile testing machine.

(2) Tackiness was measured as follows: A sizing liquid was coated on a polyester film to form a film having a thickness of 100μ, and after placing a sheet of the film on top of the other and loading 1 kg./cm.$^2$ at 20° C., 75% RH and allowing to stand for 24 hours, the peeling strength was measured by a tensile testing machine.

EXAMPLES 4 to 8

Waste water containing a modified polyvinyl alcohol having the following composition was treated in the same manner as in Example 3.

Example 4: Modified polyvinyl alcohol having a degree of hydrolysis in the vinyl acetate units of 55% by mole, obtained by hydrolyzing copolymer of vinyl acetate and 2.0% by mole of crotonic acid in methanol in the presence of sodium hydroxide catalyst Example 5: Modified polyvinyl alcohol having a degree of hydrolysis in the vinyl acetate units of 65% by mole, obtained by hydrolyzing copolymer of vinyl acetate and 1.2% by mole of acrylic acid in methanol in the presence of sodium hydroxide catalyst Example 6: Modified polyvinyl alcohol having a degree of hydrolysis in the vinyl acetate units of 65% by mole, obtained by hydrolyzing copolymer of vinyl acetate and 1.2% by mole of methacrylic acid in methanol in the presence of sodium hydroxide catalyst Example 7: Modified polyvinyl alcohol having a degree of hydrolysis in the vinyl acetate units of 68% by mole, obtained by hydrolyzing copolymer of vinyl acetate and 0.3% by mole of allylsulfonic acid in methanol in the presence of sodium hydroxide catalyst Example 8: Modified polyvinyl alcohol having a degree of hydrolysis in the vinyl acetate units of 70% by mole, obtained by hydrolyzing copolymer of vinyl acetate and 0.3% by mole of 2-methylallylsulfonic acid in methanol in the presence of sodium hydroxide catalyst The treating conditions and the results are shown in Table 4.

Table 4

| | Concentration of modified polyvinyl alcohol in waste water % | Treating condition Tempeature of waste water °C. | Acid added | Form of deposit | Recovery % | Reproduction and reuse |
|---|---|---|---|---|---|---|
| Example 4 | 0.4 | 60 | hydrochloric acid | white creamy matter | 90 | possible |
| Example 5 | 0.4 | 60 | acetic acid | white creamy matter | 75 | possible |
| Example 6 | 0.4 | 60 | sulfuric acid | white creamy matter | 75 | possible |
| Example 7 | 0.4 | 60 | hydrochloric acid | white creamy matter | 70 | possible |
| Example 8 | 0.4 | 60 | hydrochloric acid | white creamy matter | 70 | possible |

What is claimed is:

1. A process for recovering a modified polyvinyl alcohol from an aqueous solution thereof consisting essentially of the steps of adding an acid to an aqueous solution of a modified polyvinyl alcohol while maintaining said aqueous solution at a temperature of not less than 40° to cause the modified polyvinyl alcohol to deposit, and recovering the deposited polyvinyl alcohol; said modified polyvinyl alcohol being a polymer obtained by alkali-hydrolysis of a copolymer of vinyl acetate and an unsaturated carboxylic or sulfonic acid, the copolymer containing 0.1 to 2% by mole of units of the unsaturated carboxylic or sulfonic acid and the degree of hydrolysis of the vinyl acetate units being 50 to 80% by mole and said acid being added in a amount of an equivalent or more with respect to the unsaturated carboxylic or sulfonic acid component of said modified polyvinyl alcohol and being at least one member selected from the group consisting of hydrochloric acid, sulfuric acid, nitric acid, phosphoric acid, pyrophosphoric acid, phosphorous acid, acetic acid, oxalic acid and citric acid.

2. The process of claim 1, wherein said aqueous solution is maintained at a temperature of not less than 50° C.

3. The process of claim 1, wherein said unsaturated carboxylic acid is at least one member selected from the group consisting of acrylic acid, methacrylic acid, crotonic acid, maleic acid monoalkyl esters and fumaric acid monoalkyl esters.

4. The process of claim 1, wherein said unsaturated sulfonic acid is at least one member selected from the group consisting of ethylenesulfonic acid, allylsulfonic acid and 2-methylallylsulfonic acid.

5. The process of claim 1, wherein said modified polyvinyl alcohol is present in the form of the salt with an alkali metal selected from lithium, sodium and potassium.

6. The process of claim 1, wherein said acid is added to the aqueous solution in an amount of 5 to 20 times the equivalent with respect to the unsaturated carboxylic or sulfonic acid salt component of said modified polyvinyl alcohol.

7. The process of claim 1 wherein said acid is added to said aqueous solution in an amount of 5–20 equivalents of the unsaturated acid component, the solution is agitated and aerated to cause the modified polyvinyl alcohol to separate as a creamy foam above said solution, the creamy foam is removed and the polyvinyl alcohol is regenerated by addition of an alkali thereto.

* * * * *